United States Patent [19]
Koch, III

[11] Patent Number: 5,299,720
[45] Date of Patent: Apr. 5, 1994

[54] COMBINED HANDLE AND FRICTION CONNECTOR FOR CONTAINERS AND THE LIKE

[76] Inventor: Henry W. Koch, III, 52 Van Sicklen Rd., Williston, Vt. 05495

[21] Appl. No.: 930,782

[22] Filed: Aug. 17, 1992

[51] Int. Cl.⁵ .......................... B60R 11/00; B62J 9/00; B62J 11/00
[52] U.S. Cl. .................................. 224/35; 224/32 R; 224/42.46 R; 294/141; 294/149; 294/152
[58] Field of Search .................. 224/39, 32 R, 35, 37, 224/30 R, 42.46 R; 294/31.2, 157, 141, 142, 149, 152, 156; 220/756, 751, 771, 759; 215/100 A; 248/214, 313, 230, 229

[56] References Cited
U.S. PATENT DOCUMENTS

| | | | |
|---|---|---|---|
| 596,998 | 1/1898 | Hawkins et al. | |
| 600,238 | 3/1898 | Sheppard | 224/35 |
| 2,605,945 | 8/1952 | Dechar | 270/759 |
| 3,920,140 | 11/1975 | Kiser | 215/100 |
| 4,334,642 | 6/1982 | Reisch | 224/37 |
| 5,011,055 | 4/1991 | Neugent | 224/39 |
| 5,024,358 | 6/1991 | Reichert et al. | 224/35 |

*Primary Examiner*—Linda J. Sholl
*Attorney, Agent, or Firm*—Brady, O'Boyle & Gates

[57] ABSTRACT

A combined handle and friction connector for a container in which a handle assembly can either be integral with a container or attachable thereto. The handle is spaced from the container by an opening for receiving the hand of the user, and has a snap-on groove for detachably connecting the handle and the associated container to a tubular support having a range of varying diameters, such as, a bicycle frame, a boat railing, a lawn mower, a broom handle, or the like. The handle assembly performs the dual function of a snap-on connector, and as a handle to facilitate the carrying of the container after being removed from the tubular support.

17 Claims, 5 Drawing Sheets

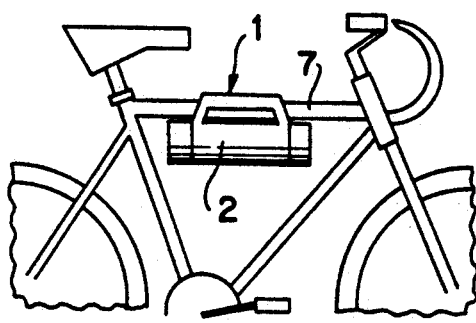
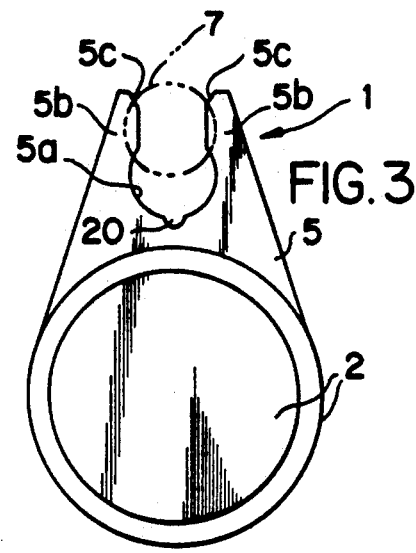
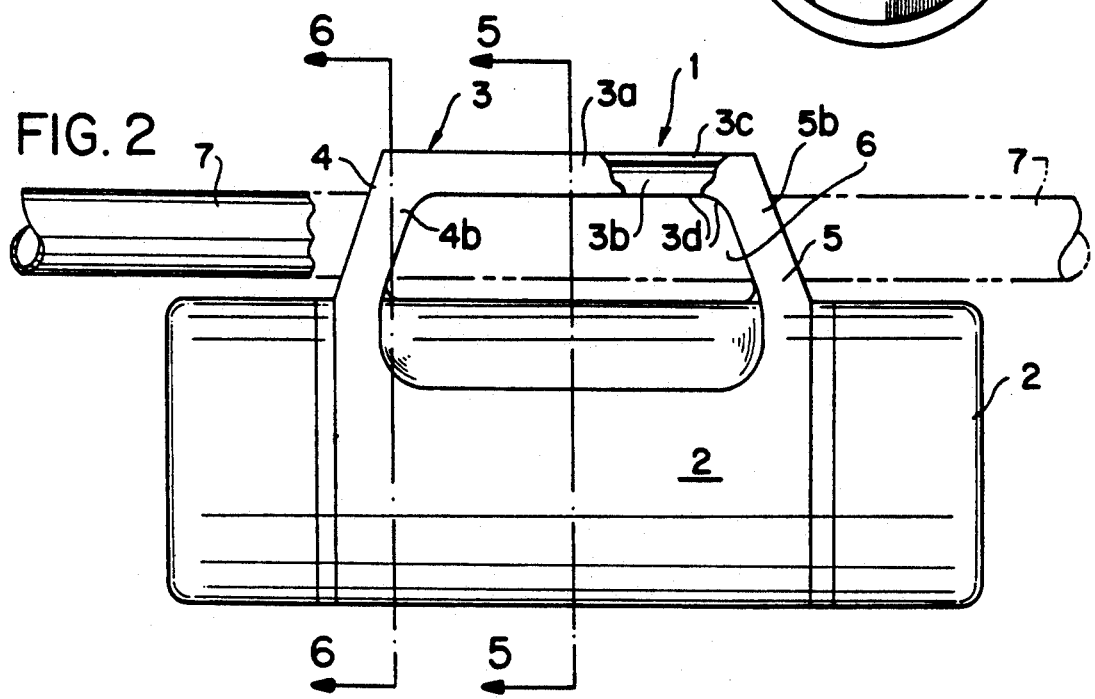
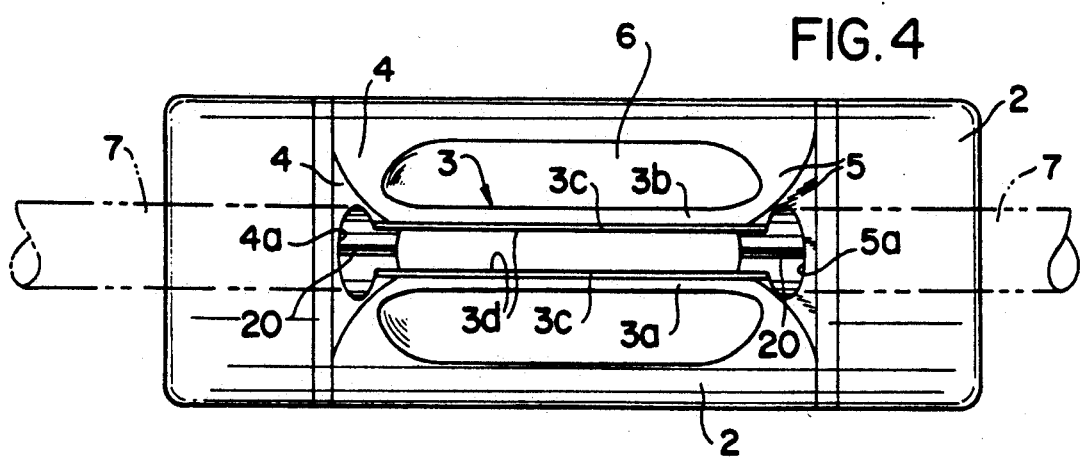

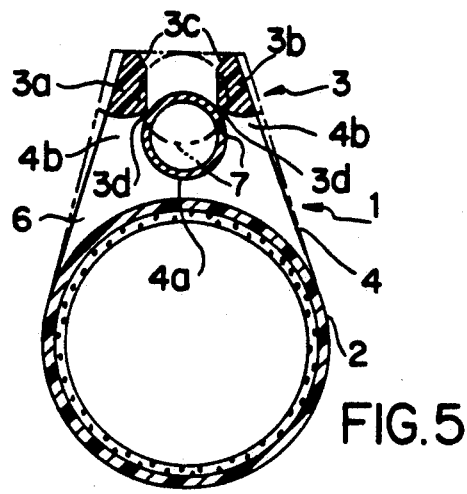
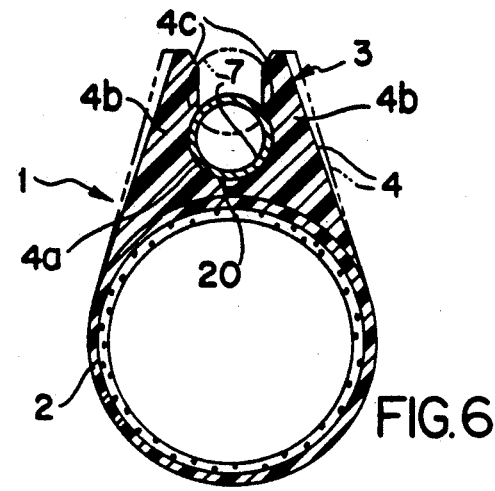
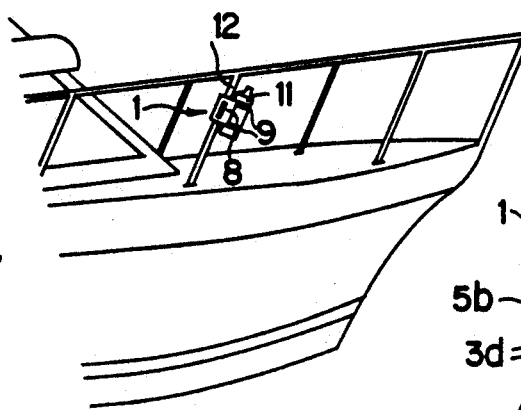
FIG. 7
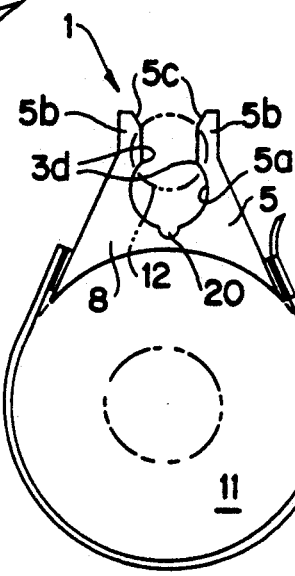
FIG. 10
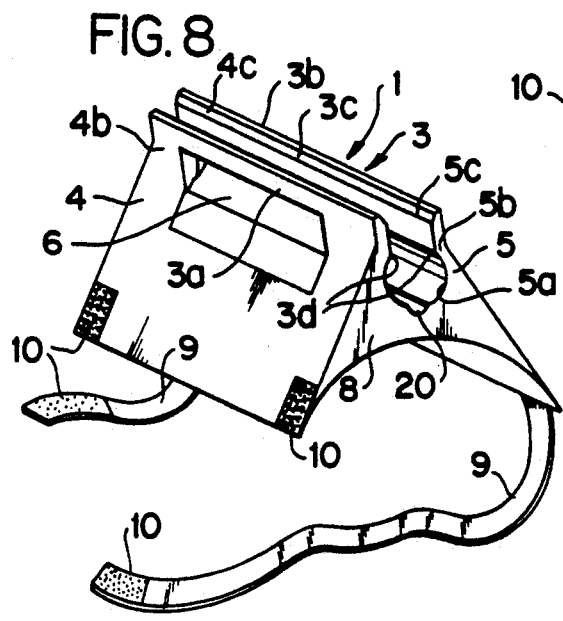
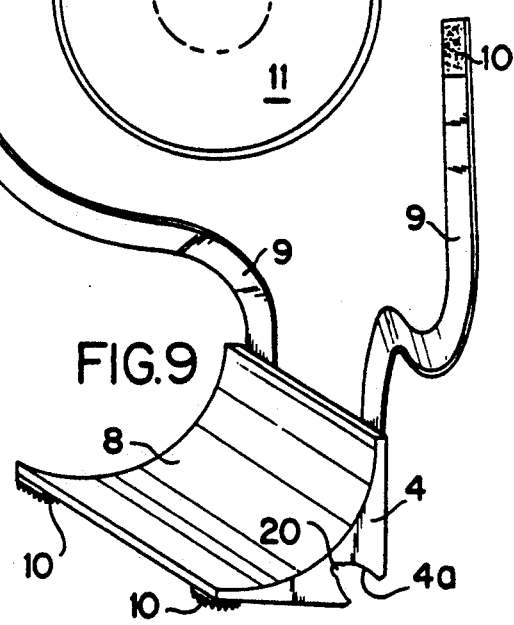
FIG. 9

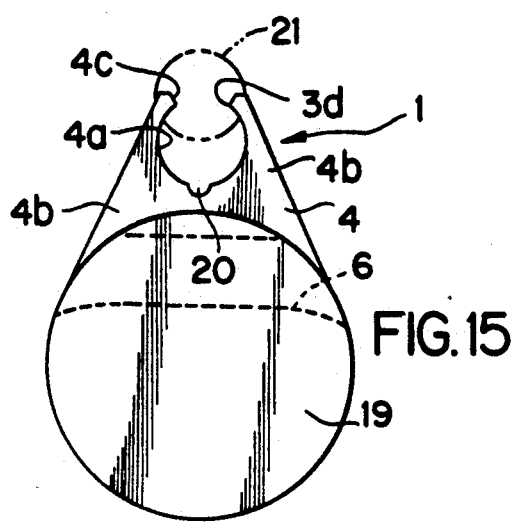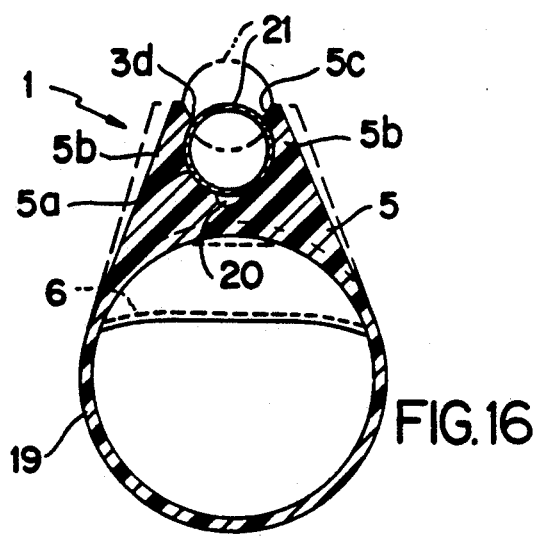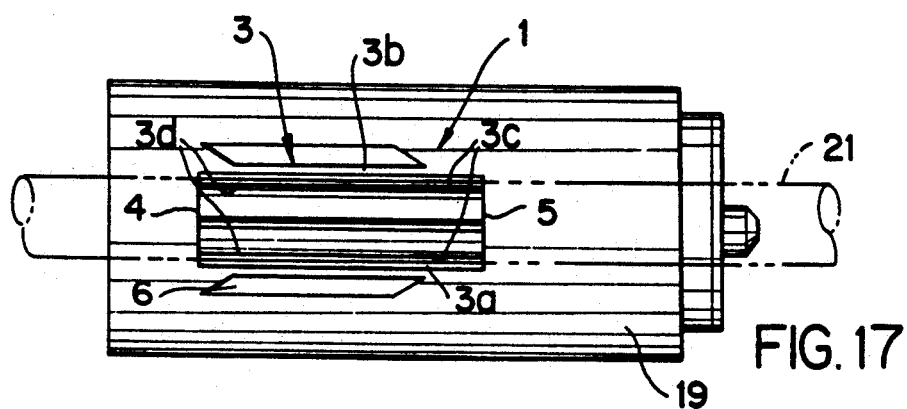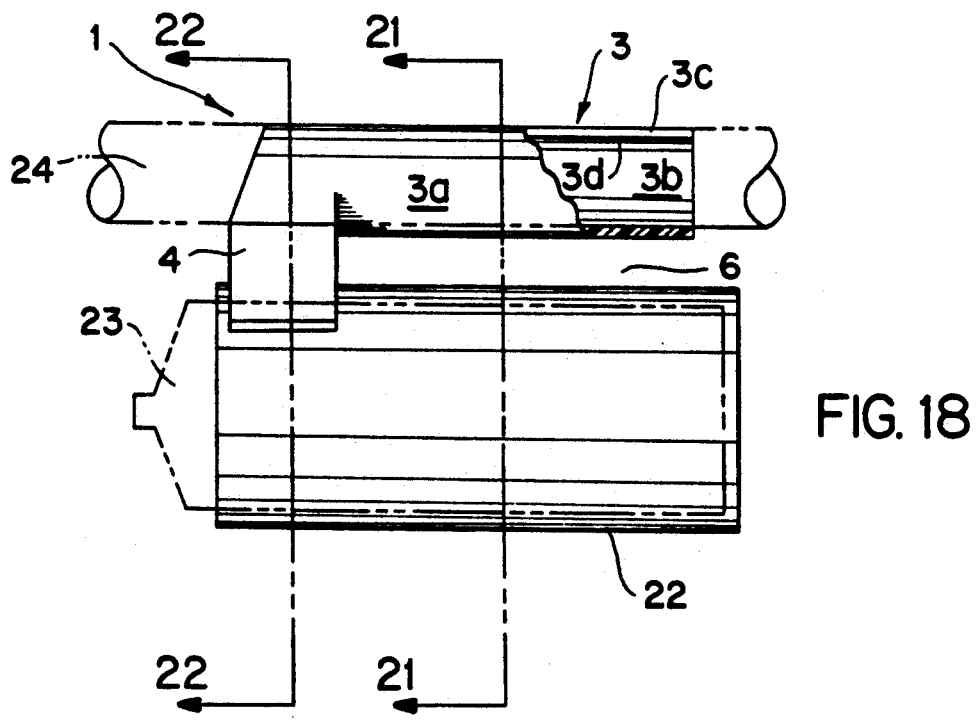

5,299,720

COMBINED HANDLE AND FRICTION CONNECTOR FOR CONTAINERS AND THE LIKE

BACKGROUND OF THE INVENTION

Various snap-on friction connectors have been provided for attachably connecting a container to a tubular member, such as a bicycle frame. Such connectors can either be integral with the container as disclosed in U.S. Pat. Nos. 596,998; 3,920,140; and 5,024,358; or as a separate connector as disclosed in U.S. Pat. No. 4,334,642.

While these connectors have been satisfactory for their intended purpose, their only function was to connect the container to the bicycle frame.

After considerable research and experimentation, the snap-on friction connector of the present invention has been devised, wherein the connector is an integral part of a handle assembly by which the container may be carried when not mounted on a tubular member.

SUMMARY OF THE INVENTION

The combined handle and friction connector of the present invention comprises, essentially, a handle assembly which can be either integral with a container or as an attachment detachably connected to a container. The handle extends outwardly from the container and parallel to the longitudinal axis of the container. The handle includes a longitudinally extending portion having a snap-on groove formed therein, and at least one bridge portion connecting the longitudinal portion to the container or attachment.

By the construction and arrangement of the device of the present invention, the connector performs the dual function of a snap-on connector and as a handle to facilitate the carrying of the container after being removed from a tubular support.

The combined handle and friction connector is readily adaptable for supporting various types of containers on various types of tubular supports within a range of diameters, such as, but not limited to, a Thermos ® container, lunch box, tool kit, radio or tape player, flashlight, utility container, or drink container on a bicycle frame; a utility container or drink container on a boat railing, or rail on exercise machines, hospital beds, walkers for disabled persons, infant strollers (i.e. baby bottle), or beach chairs; a tool box, drink container or gas container on the tubular handle frame of a lawn mower, a drink container or utility container for extra line or fuel on a lawn trimmer; or a container for a janitorial supplies container attached to the handle of a push broom, squeegee, mop, or the like.

BRIEF DESCRIPTION OF THE DRAWINGS

FIG. 1 is a diagrammatic view of one embodiment of the invention showing the combined handle and friction connector mounting a Thermos or other type container on the tubular frame of a bicycle;

FIG. 2 is an enlarged, fragmentary, side elevational view of the embodiment shown in FIG. 1;

FIG. 3 is an end elevational view of the embodiment shown in FIG. 2;

FIG. 4 is a top plan view of the embodiment shown in FIG. 2;

FIG. 5 is a cross-section view taken substantially along line 5—5 of FIG. 2;

FIG. 6 is a cross-section view taken substantially along line 6—6 of FIG. 2;

FIG. 7 is a diagrammatic view showing the combined handle and friction connector of the present invention detachably connecting a container to the tubular railing of a boat;

FIG. 8 is a perspective view of an another embodiment of the invention wherein the combined handle and friction connector are constructed as an attachment for a container;

FIG. 9 is a perspective view of the embodiment of FIG. 8 showing the interior side of the attachment;

FIG. 10 is an end elevational view showing the attachment of FIGS. 8 and 9 connected to a container shown in phantom lines;

FIG. 14 is a side elevational view of the combined handle and connector of the present invention integral with a container for liquids or the like;

FIG. 15 is an end elevational view of the embodiment shown in FIG. 14;

FIG. 16 is a cross-sectional view taken substantially along line 16—16 of FIG. 14;

FIG. 17 is a top plan view of the embodiment shown in FIG. 14;

FIG. 18 is a side elevational view of yet another embodiment of the invention wherein the combined handle and friction connector is integrally connected to the container in a cantilevered manner;

DESCRIPTION OF THE PREFERRED EMBODIMENTS

Figure 11:
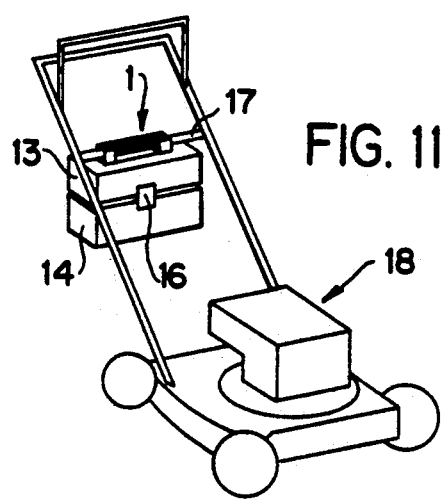
FIG. 11 is a diagrammatic view of the combined handle and friction connector of the present invention integral with the lid of a tool box mounted on the tubular handle frame of a lawn mower.

Referring to the drawings, and more particularly to FIGS. 1 to 6, wherein the first embodiment of the invention is shown, the combined handle and friction connector 1 is integrally connected to a container 2, such as a Thermos ® jug, having a screw cap at one or both ends, the outer wall of the container 2 and connector 1 being plastic facilitates the molding of the components as an integral unit. The combined handle and friction connector 1 comprises a portion 3 spaced outwardly from the container 2 and extending parallel to the longitudinal axis of the container. The longitudinally extending member 3 is connected to the container 2 and held in spaced relationship thereto by bridging members 4 and 5 extending between the container and each end of the longitudinal member 3 and formed integral therewith.

The space 6 defined by the member 3, bridging members 4 and 5 as outer surface of the container 2, provides an opening for receiving the hand of the user, whereby the member 3 can be gripped to facilitate carrying the container 2.

As will be seen in FIGS. 3 and 6, the bridge members 4 and 5 are bifurcated having a circular recess 4a and 5a at the bight portion of the bifurcation and a pair of resilient arms 4b, 5b. The upper end portions of the resilient arms 4b, 5b are provided with sloped surfaces 4c, 5c to facilitate the camming insertion of the combined handle and connector 1 onto a tubular support 7 having a diameter within a certain range.

As will be seen in FIGS. 1 and 5, the longitudinally extending member 3 comprises a pair of spaced, parallel arms 3a and 3b having sloped surfaces 3c at the upper end thereof to facilitate insertion of the tubular support 7, and an inwardly extending lip portion 3d at the lower end thereof to hold the tubular support 7 in the space 6.

In using the combined handle and friction connector 1 of the embodiment shown in FIGS. 1 to 6, if the support tube 7 is considered part of the tubular frame of a bicycle, as shown in FIG. 1, the container 2 is placed underneath the tube 7, with the combined handle and friction connector 1 positioned facing upwardly, as shown. The container is merely pushed upwardly to snap the tubular frame 7 into the bifurcated bridging members 4 and 5 and under the longitudinally extending lip portions 3d of arms 3a and 3b. During this friction connection snap action the sloping surfaces 3c, 4c and 5c engaging the tube 7 cam and flex the pairs of resilient arms 4b and 5b, and the parallel arms 3a, 3b outwardly, as shown in phantom lines in FIGS. 5 and 6, allowing the tube to snap beneath the lip portions 3d, to thus be frictionally engaged by the handle. Tube 7 is released by the handle merely by pulling on the container in a direction away from the tube 7, which causes the tube to cam and flex the resilient arms 4b and 5b, and the parallel arms 3a, 3b apart, by engagement with lip portions 3d. Typically, one size of the combined handle and friction connector 1 can be constructed to receive tubular support members 7 therein having diameters in the range, for example, of seven-eighth of an inch to one-and-one-eighth inches. Tubular framing on lawn mower handles and on boat rails are generally approximately seven-eighth of an inch in diameter, whereas tubular framing on bicycles generally have diameters in the range of one inch to one-and-one-eighth inches. A larger version of the combined handle and friction connector 1 can be constructed for receiving tubular supports of larger diameters, such as in the diameter range of one-and-one-half inches to one-and-three-quarter inches.

At the bottom of circular recesses 4a and 5a in bridge members 4 and 5, shallow longitudinally extending grooves 20 are provided for housing a bicycle cable, or the like, extending along the bottom of tubular support 7 of a bicycle frame, so that the tubular support 7 can be completely frictionally inserted into the circular recesses 4a and 5a, so that the diameter of the tubular support is below the gripping portions or inwardly extending lip portions 3d of the parallel arms 3a and 3b. Grooves 20 can be omitted from certain combined handle and friction connectors of the invention when there is no need for providing recesses for a cable or the like, or if it is not intended for use on a bicycle frame, etc.

FIGS. 8, 9 and 10 illustrate another embodiment of the invention wherein in lieu of forming the combined handle and friction connector 1 integral with a container as shown in FIGS. 1 to 6, the combined handle and friction connector 1 is constructed and arranged as an attachment to be detachably connected to a drink container, utility container, or the like. To this end, the combined handle and friction connector 1 are integral with a semi-cylindrical base member 8 having a pair of straps 9 connected at one end thereto, and provided with suitable fasteners 10, such as Velcro, on the side opposite the strap connections and on the mating free ends of the straps, whereby the combined handle and friction connector can be detachably connected to a container 11 and the assembly can be snapped onto a tubular support such as the bicycle frame 7 shown in FIG. 1, or a railing 12 of a boat as shown in FIG. 7, or some other tubular member. The pair of connector straps 9 have been shown as flexible material straps with Velcro fasteners, but it is to be understood that they can be other type of adjustable and releasable plastic strapping, or may be friction clips to hold a container to the base member 8.

Figure 12:
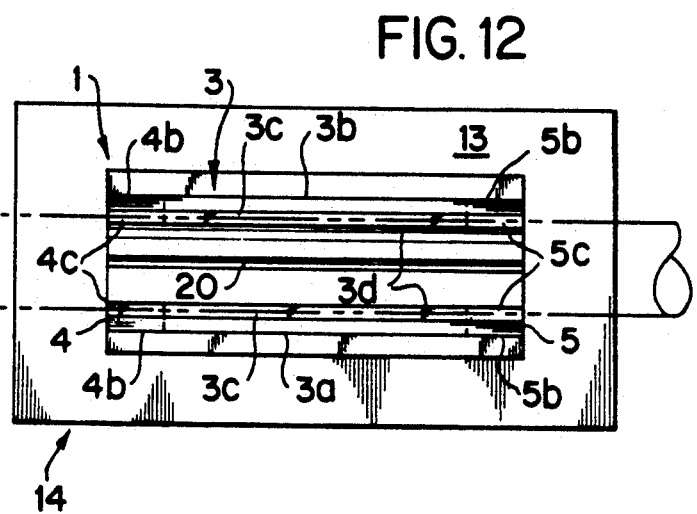
FIG. 12 is a top plan view of the handle and friction connector on the tool box illustrated in FIG. 11.
Figure 13:
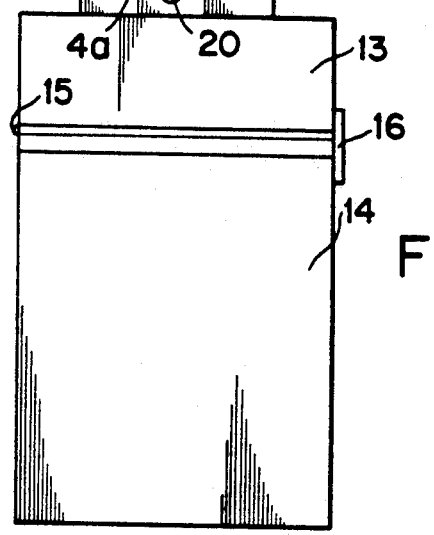
FIG. 13 is an end elevational view of the tool box and associated handle and connector shown in FIG. 12.
Figure 14:
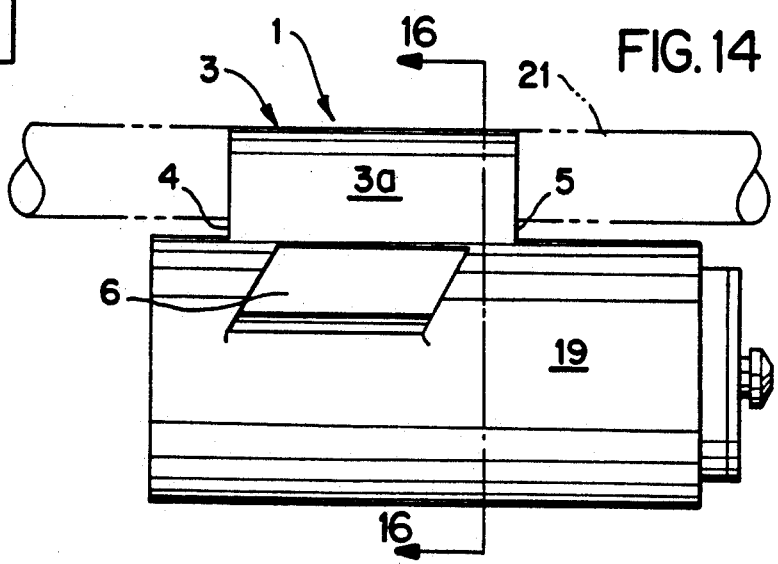

FIGS. 11, 12 and 13 illustrate another application of the combined handle and friction connector 1 integrally connected to the lid 13 of a plastic utility or tool box 14, the lid being hingedly connected to the box as at 15 and a lid latch being provided at 16. The box 14 can be snapped onto a tubular support such as the bicycle frame 7 shown in FIG. 1, the horizontal portion of the boat railing 12 shown in FIG. 7, or the tubular frame portion 17 of the handle of a lawn mower 18 shown in FIG. 11.

FIGS. 14 to 17 illustrate still another embodiment of the invention, wherein the container portion of the combined handle and friction connector 1 comprises an integral hollow plastic container 19, for liquids or the like, being snapped on a suitable tubular support 21. In this form of the container, the space 6 for receiving the hand of the user is spaced inwardly of the side edge of the container 19, and the tubular support 21 in the frictionally engaged position is contained between the pair of parallel arms 3a and 3b of the longitudinally extending handle member 3, and between the pairs of resilient arms 4b, 5b of the bridge members 4 and 5.

Figure 19:
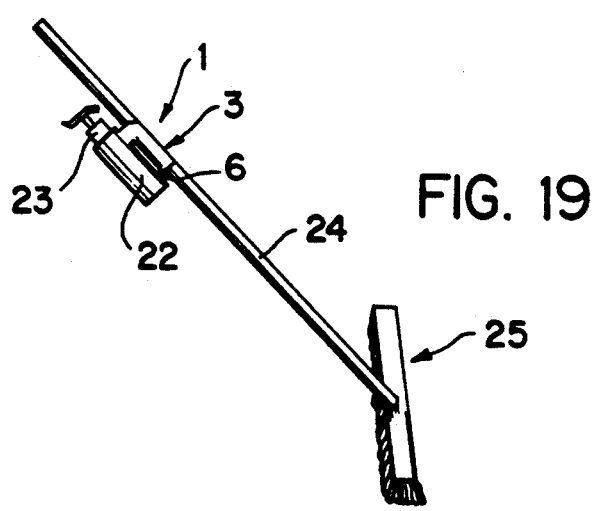
FIG. 19 is a diagrammatic view showing the embodiment of FIG. 18 connected to the handle of a push broom.
Figure 20:
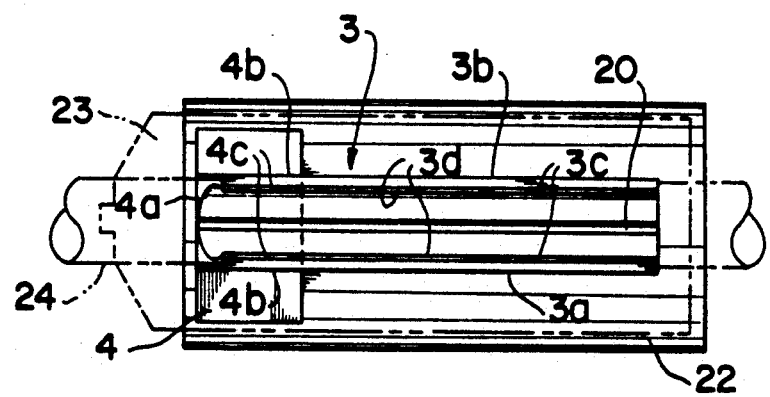
FIG. 20 is a top plan view of the embodiment shown in FIG. 18.
Figure 21:
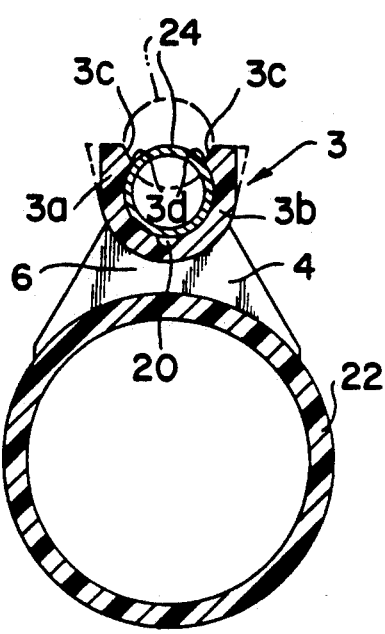
FIG. 21 is a cross-sectional view taken substantially along line 21—21 of FIG. 18.
Figure 22:
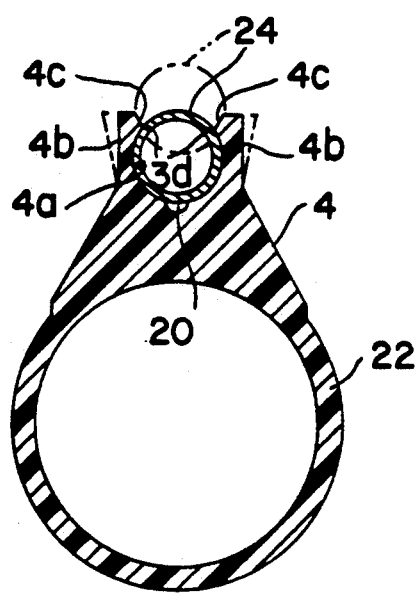
FIG. 22 is a cross-sectional view taken substantially along line 22—22 of FIG. 18.

FIGS. 18 to 22 illustrate yet still another embodiment of the invention, wherein the longitudinally extending member 3 is connected to the container 22 and held in spaced relationship thereto by the one bridging member 4. The container 22 is shown in the form of an insulated or uninsulated cup for receiving a container 23 of fluid, such as cleaning fluid, or a drink can or bottle, whereby the container cup 22 can be snapped onto tubular member, such as the handle 24 of push broom 25, as shown in FIG. 19. As will be seen in FIG. 21, the longitudinally extending member 3 is a continuation of the circular recess 4a in the bight portion of the bifurcated pair of resilient arms 4b. The longitudinally extended member 3 to be gripped for carrying the container cup 22 is thus cantilevered along the side of the container cup by single bridging member 4 including the pair of resilient arms 4b. As in the other forms of the invention, the inwardly extending lip portions 3d at the upper end of parallel arms 3a, 3b and resilient arms 4b, below sloping cam surfaces 3c and 4c, respectively, frictionally engage the top portion of the tube 24, or the like, to retain the handle and the attached cup on the tube. When removed from the tube, the cantilevered handle can also serve as a hook or a means of hanging. It easily hangs on a person's belt or waistband.

The terms and expression which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A combined handle and friction connector for a body member comprising, a longitudinally extending member spaced radially outwardly from the body member and extending parallel to the longitudinal axis of said body member, said longitudinally extending member including a pair of oppositely spaced, resilient arms that are coextensively parallel and together form a handle portion, at least one bridge member operatively connected between the body member and the longitudinally extending member for holding the longitudinally extending member in spaced relationship to said body member, the space between said longitudinally extending member and the body member providing an opening for receiving the hand of a user when gripping the longitudinally extending member including the pair of spaced parallel resilient arms as a handle portion, and resilient arms provided in the bridge member, the pair of spaced parallel, resilient arms and the resilient arms of the bridge member adapted to receive a selected tubular support member, whereby the handle and associate body member can be snapped onto the tubular support member.

2. A combined handle and friction connector according to claim 1, wherein a bridge member is integral with each end of the longitudinally extending member and the body member.

3. A combined handle and friction connector according to claim 1, wherein one end of a bridge member is integral with each end of the longitudinally extending member, a semi-cylindrical base member, the opposite end of each bridge member being integral with said base member, and fastening means mounted on said base member for securing said base member and associated handle and friction connector to a body member.

4. A combined handle and friction connector according to claim 2, wherein the body member comprises a sleeve for receiving selective containers.

5. A combined handle and friction connector according to claim 2, wherein the body member comprises a utility box having a hinged cover, the combined handle and friction connector being connected to said cover.

6. A combined handle and friction connector according to claim 1, wherein the body member comprises a cup for receiving selective containers.

7. A combined handle and friction connector according to claim 1, wherein the tubular support member comprises a selected one of a bicycle frame, a boat railing, a lawnmower handle, and a broom handle.

8. A combined handle an friction connector according to claim 1, wherein the bridge member is bifurcated having a circular recess at the bight portion thereof and a pair of spaced arms extending upwardly therefrom, a sloped surface on the upper end portion of each arm to facilitate the insertion of the combined handle and connector on the tubular support.

9. A combined handle and friction connector according to claim 1, wherein one end of a bridge member is integral with each end of the longitudinally extending member, a base member, the opposite end of each bridge member being integral with said base member, and fastening means for securing said base member and associated handle and friction connector to a body member.

10. A combined and friction connector for containers comprising, a longitudinally extending member spaced radially outwardly from the container and extending parallel to the longitudinal axis of said container, the longitudinally extending member comprising a pair of spaced, parallel, resilient arms, at least one bridge member operatively connected between the container and the longitudinally extending member for holding the longitudinally extending member in spaced relationship to said container, the space between said longitudinally extending member and the container providing an opening for receiving the hand of a user, resilient arms provided in the bridge member, the pair of spaced, parallel, resilient arms and the resilient arms of the bridge member adapted to receive a selected tubular support member, and a sloped surface on the upper end portion of each arm of the longitudinally extending member to facilitate the insertion of the tubular support, whereby the handle and associated container can be snapped onto the tubular support member.

11. A combined handle and friction connector according to claim 10, wherein an inwardly extending lip is provided on each arm below the sloped surface for holding the tubular support in said space.

12. A combined handle and friction connector according to claim 10, wherein said bridge member is bifurcated and having a recess at the bight portion thereof and a pair of spaced arms extending upwardly therefrom and connected to said pair of spaced parallel arms.

13. A combined handle and friction connector according to claim 12, including a sloped surface on the upper end portion of each arm of said pair of spaced arms of said bridge member, and said sloped surface on the upper end portion of each arm being in alignment with the sloped surface on the upper end portion of each of said parallel arms of said longitudinally extending member.

14. A combined handle and friction connector according to claim 10, including gripping portions positioned below said sloped surface of each parallel arm and extending longitudinally thereof, for frictionally engaging a tubular support member.

15. A combined handle and friction connector according to claim 13, in which said gripping portions comprise inwardly extending lip portions for receiving a tubular support therebetween.

16. A combined handle and friction connector according to claim 13, including gripping portions positioned below said sloped surface of each parallel arm and below the sloped surface on the upper end portion of each arm of said pair of spaced arms of said bridge member, and extending longitudinally of and substantially coextensive with said parallel arms and pair of spaced arms of said bridge member.

17. A combined handle and friction connector according to claim 16, in which said gripping portions comprise inwardly extending lip portions for frictionally engaging a tubular member therebetween.

* * * * *